(12) United States Patent (10) Patent No.: US 10,478,783 B2
Noda (45) Date of Patent: Nov. 19, 2019

(54) SEPARATION MEMBRANE STRUCTURE

(71) Applicant: NGK INSULATORS, LTD., Nagoya-Shi (JP)

(72) Inventor: Kenichi Noda, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/639,070

(22) Filed: Jun. 30, 2017

(65) Prior Publication Data

US 2017/0296983 A1 Oct. 19, 2017

Related U.S. Application Data

(63) Continuation of application No. PCT/JP2016/052534, filed on Jan. 28, 2016.

(30) Foreign Application Priority Data

Jan. 30, 2015 (JP) ................................. 2015-017579

(51) Int. Cl.
*B01D 71/02* (2006.01)
*B01D 69/10* (2006.01)
(Continued)

(52) U.S. Cl.
CPC .......... *B01D 71/022* (2013.01); *B01D 63/066* (2013.01); *B01D 67/0088* (2013.01); *B01D 69/02* (2013.01); *B01D 69/06* (2013.01); *B01D 69/10* (2013.01); *B01D 69/147* (2013.01); *B01D 71/027* (2013.01); *B01D 71/028* (2013.01);
(Continued)

(58) Field of Classification Search
CPC .......... B01D 2325/20; B01D 2325/021; B01D 71/022; B01D 69/02; B01D 53/228; B01D 69/10; B01D 69/12; B01D 69/147; B01D 71/028; B01D 2257/10; B01D 2325/12;
(Continued)

(56) References Cited

U.S. PATENT DOCUMENTS 4,567,029 A * 1/1986 Wilson ..................... B01J 27/18
208/114
5,989,316 A 11/1999 Kuznicki et al.
(Continued)

FOREIGN PATENT DOCUMENTS

JP 06-170188 A1 6/1994
JP 2000-312824 A1 11/2000
(Continued)

OTHER PUBLICATIONS

English translation of International Preliminary Report on Patentability (Application No. PCT/JP2016/052534) dated Aug. 10, 2017.
(Continued)

*Primary Examiner* — Jason M Greene
(74) *Attorney, Agent, or Firm* — Burr & Brown, PLLC (57) ABSTRACT

A separation membrane structure comprises a porous support, and a separation membrane formed on the porous support. The separation membrane has an average pore diameter of greater than or equal to 0.32 nm and less than or equal to 0.44 nm. The separation membrane includes addition of at least one of a metal cation or a metal complex that tends to adsorb nitrogen in comparison to methane.

4 Claims, 2 Drawing Sheets

(51) Int. Cl.
*B01D 69/02* (2006.01)
*B01D 63/06* (2006.01)
*B01D 67/00* (2006.01)
*B01D 69/06* (2006.01)
*B01D 69/14* (2006.01)
*C01B 21/04* (2006.01)
*B01J 20/18* (2006.01)
*B01J 20/28* (2006.01)
*B01J 20/32* (2006.01)

(52) U.S. Cl.
CPC ....... *B01J 20/186* (2013.01); *B01J 20/28033* (2013.01); *B01J 20/3204* (2013.01); *B01J 20/3238* (2013.01); *C01B 21/0444* (2013.01); B01D 2325/021 (2013.01); B01D 2325/20 (2013.01); C01B 2210/007 (2013.01); C01P 2006/16 (2013.01)

(58) Field of Classification Search
CPC ................. C01P 2006/16; B01J 20/223; B01J 20/28035; B01J 20/2808
See application file for complete search history.

(56) References Cited

U.S. PATENT DOCUMENTS

| | | | | |
|---|---|---|---|---|
| 7,125,821 | B2* | 10/2006 | Xu | B01J 29/06 502/214 |
| 9,649,601 | B2* | 5/2017 | Tang | B01D 71/022 |
| 2005/0045030 | A1* | 3/2005 | Tonkovich | B01D 53/0446 95/90 |
| 2005/0139066 | A1 | 6/2005 | Miller et al. | |
| 2009/0270665 | A1* | 10/2009 | Magalhaes Mendes | B01D 53/228 585/259 |
| 2012/0031833 | A1* | 2/2012 | Ho | B01D 67/0051 210/488 |
| 2012/0141685 | A1* | 6/2012 | Gaab | D21H 19/02 247/373 |
| 2014/0050856 | A1 | 2/2014 | Kurahashi et al. | |
| 2015/0143995 | A1* | 5/2015 | Umehara | B01D 53/228 96/13 |
| 2015/0265964 | A1 | 9/2015 | Kodama et al. | |
| 2015/0273401 | A1* | 10/2015 | Miller | B01D 69/12 210/500.25 |
| 2015/0321150 | A1 | 11/2015 | Kurahashi et al. | |
| 2016/0214064 | A1* | 7/2016 | Gu | B01D 71/028 |
| 2016/0272908 | A1 | 9/2016 | Utaki et al. | |
| 2017/0296980 | A1* | 10/2017 | Noda | B01D 69/12 |

FOREIGN PATENT DOCUMENTS

| | | |
|---|---|---|
| JP | 2001-526109 A1 | 12/2001 |
| JP | 2002-128512 A1 | 5/2002 |
| JP | 2002-292261 A1 | 10/2002 |
| JP | 2004-083375 A1 | 3/2004 |
| JP | 2004-105942 A1 | 4/2004 |
| JP | 2012-236189 A1 | 12/2012 |
| JP | 2013-126649 A1 | 6/2013 |
| JP | 2014-111258 A1 | 6/2014 |
| JP | 2014-205138 A1 | 10/2014 |
| WO | 2014/080670 A1 | 5/2014 |
| WO | 2014/091937 A1 | 6/2014 |

OTHER PUBLICATIONS

U.S. Appl. No. 15/638,976, filed Jun. 30, 2017, Noda, Kenichi.
Ting Wu, et al., "Influence of Propane on $CO_2/CH_4$ and $N_2/CH_4$ Separations in CHA Zeolite Membranes," *Journal of Membrane Science*, vol. 473 (2015), pp. 201-209.
J. van den Bergh, et al., "Separation and Permeation Characteristics of a DD3R Zeolite Membrane," *Journal of Membrane Science*, vol. 316 (2008), pp. 35-45.
Lloyd M. Robeson, "The Upper Bound Revisited," *Journal of Membrane Science*, vol. 320 (2008), pp. 390-400.
International Search Report and Written Opinion (Application No. PCT/JP2016/052534) dated Mar. 8, 2016.

\* cited by examiner

SEPARATION MEMBRANE STRUCTURE

BACKGROUND OF THE INVENTION

1. Field of the Invention

The present invention relates a separation membrane structure configured to separate methane and nitrogen.

2. Description of Related Art

Various methods have been proposed for the purpose of separating methane and nitrogen.

For example, there has been proposal of a means for adsorption and removal of nitrogen by use of a pressure swing adsorption method using a molecular sieve of activated carbon (reference is made to Patent Literature 1), or a method of adsorption and removal of nitrogen by a pressure swing adsorption method using ETS-4 in which cations are exchanged to barium (reference is made to Patent Literature 2).

Furthermore a means for separating nitrogen by a membrane separation method respectively using a CHA-type zeolite membrane, a DDR type zeolite membrane or an organic membrane is also known (reference is made to Non-Patent Literature 1 to 3).

CITATION LIST

Patent Literature

[Patent Literature 1] Japanese Patent Application Laid-Open No. 2000-312824
[Patent Literature 2] Published Japanese Translation No. 2001-526109 of the PCT International Application

Non-Patent Literature

[Non-Patent Literature 1] Ting Wu et al. (6 others), "Influence of propane on $CO_2/CH_4$ and $N_2/CH_4$ separations in CHA zeolite membranes" Journal of Membrane Science, 473 (2015) 201-209.
[Non-Patent Literature 2] J. van den Bergh et al. (4 others), "Separation and permeation characteristics of a DD3R zeolite membrane", Journal of Membrane Science, 316 (2008) 35-45.
[Non-Patent Literature 3] Lloyd M. Robeson, "The upper bound revisited", Journal of Membrane Science, 320 (2008) 390-400.

SUMMARY OF THE INVENTION

Technical Problem

However, the means discussed above have not reached sufficient separation performance since the molecular diameter of methane is close to the molecular diameter of nitrogen.

The present invention is proposed based on the new insight above, and has the object of providing a separation membrane structure that can efficiently separate methane and nitrogen.

Solution to Problem

The separation membrane structure according to the present invention comprises a porous support, and a separation membrane formed on the porous support. The separation membrane has an average pore diameter of greater than or equal to 0.32 nm and less than or equal to 0.44 nm. The separation membrane includes at least one of a metal cation or a metal complex that tends to adsorb nitrogen in comparison to methane.

Advantageous Effects of Invention

According to the present invention, it is possible to provide a separation membrane structure that is configured to efficiently separate methane and nitrogen.

DETAILED DESCRIPTION OF THE INVENTION

An embodiment of the present invention will be described below making reference to the figures. Those aspects of configuration in the following description of the figures that are the same or similar are denoted by the same or similar reference numerals. However, the figures are merely illustrative, and the actual ratios or the like of the respective dimensions may differ.

Configuration of Separation Membrane Structure 10

Figure 1:
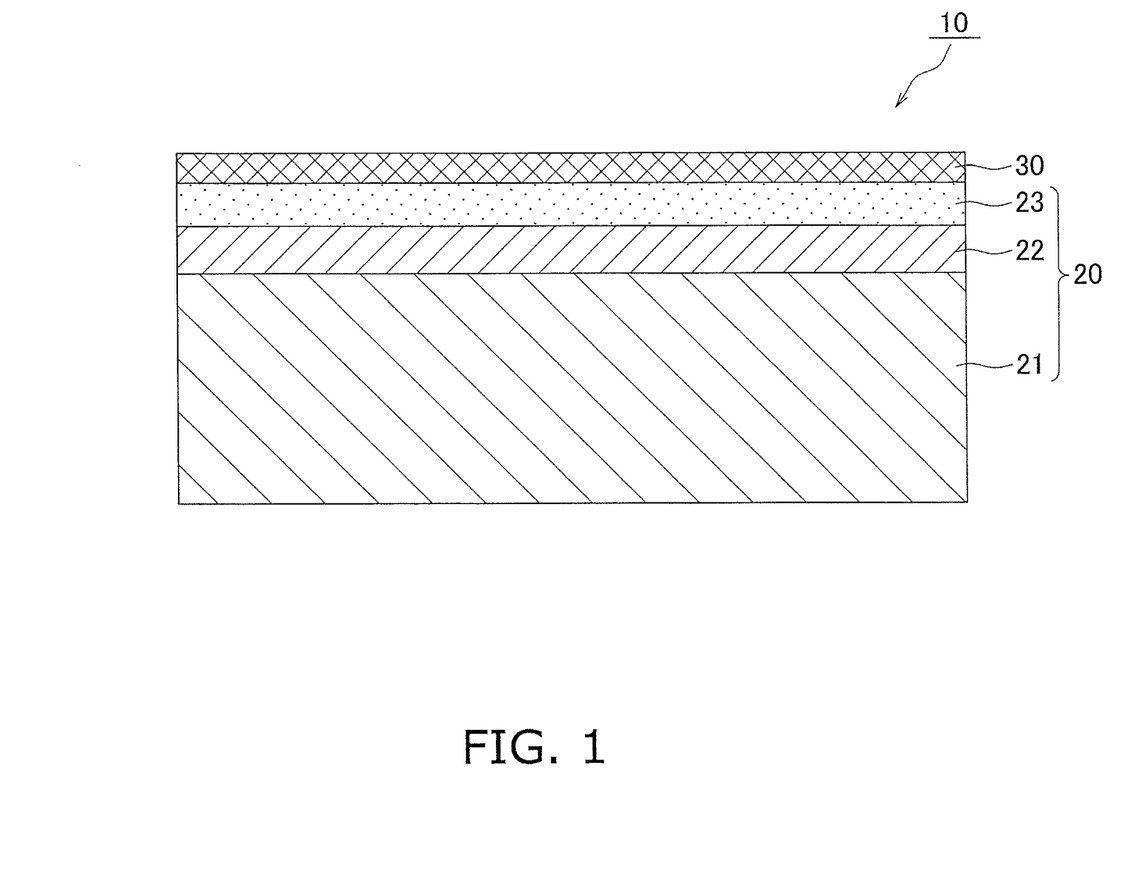
FIG. 1 is a cross-sectional view of a separation membrane structure.

FIG. 1 is a cross-sectional view of a separation membrane structure 10. The separation membrane structure 10 enables selective permeation of nitrogen in a mixed gas that contains at least methane molecule (referred to below as "methane") and nitrogen molecule (referred to below as "nitrogen"). The separation membrane structure 10 includes a porous support 20 and a separation membrane 30.

The porous support 20 supports the separation membrane 30. The porous support 20 exhibits chemical stability that enables the formation (crystallization, coating, or precipitation) of the separation membrane 30 in a membrane configuration on a surface.

The porous support 20 may be configured in a shape to enable supply a mixed gas that contains at least methane and nitrogen to the separation membrane 30. The shape of the porous support 20 for example may be configured in a honeycomb, monolithic, flat, tubular, cylindrical, columnar, square column shape, or the like.

The porous support 20 according to the present embodiment has a substrate 21, an intermediate layer 22 and a surface layer 23.

The substrate 21 is configured from a porous material. The porous material includes for example, a sintered ceramic, a metal, an organic polymer, glass, carbon or the like. The sintered ceramic includes alumina, silica, mullite, zirconia, titania, yttria, silicon nitride, silicon carbide, or the like. The metal includes aluminum, iron, bronze, stainless steel, or the like. The organic polymer includes polyethylene, polypropylene, polytetrafluoroethylene, polysulfone, polyimide or the like.

The substrate 21 may include an inorganic binder. The inorganic binder may include use of at least one of titania, mullite, sinterable alumina, silica, glass frits, clay minerals, and sinterable cordierite.

The average particle diameter of the substrate 21 may be configured as 5 microns to 25 microns. The average pore diameter of the substrate 21 can be measured using a mercury porosimeter. The porosity of the substrate 21 may be configured for example as 25% to 50%. The average particle diameter of the porous material that configures the substrate 21 may be configured for example as 5 microns to 100 microns. In the present embodiment, the term "average particle diameter" denotes the value of the arithmetic mean for the maximum diameter of 30 measured particles that are measured by cross sectional micro-structure observation by use of a scanning electron microscope (SEM).

The intermediate layer 22 is formed on the substrate 21. The intermediate layer 22 can be configured by the porous material that can be used in the substrate 21. The average pore diameter of the intermediate layer 22 may be smaller than the average pore diameter of the substrate 21, and may be configured for example as 0.005 microns to 2 microns. The average pore diameter of the intermediate layer 22 may be measured by a perm-porometer. The porosity of the intermediate layer 22 may be configured as 20% to 60%. The thickness of the intermediate layer 22 may be configured for example as 30 microns to 300 microns.

The surface layer 23 is formed on the intermediate layer 22. The surface layer 23 can be configured by the porous material that can be used in the substrate 21. The average pore diameter of the surface layer 23 may be smaller than the average pore diameter of the intermediate layer 22, and may be configured for example as 0.001 microns to 1 micron. The average pore diameter of the surface layer 23 may be measured by a perm-porometer. The porosity of the surface layer 23 may be configured to 20% to 60%. The thickness of the surface layer 23 for example may be configured as 1 micron to 50 microns.

The separation membrane 30 is formed on the porous support 20 (more specifically, on the surface layer 23). The separation membrane 30 can be configured by an inorganic material, an organic material, a metal material, or a composite material of such materials. In consideration of thermal resistance properties and organic solvent resistant properties, an inorganic membrane such as a zeolite membrane, silica membrane or carbon membrane is suitable as the separation membrane 30, and a zeolite membrane is more preferred in light of the tendency to form a narrow pore diameter distribution. It is noted that a silica membrane includes an organic silica membrane in which an organic functional group is bound to silica.

The average pore diameter of the separation membrane 30 is greater than or equal to 0.32 nm and less than or equal to 0.44 nm. Therefore, the separation membrane 30 allows permeation of nitrogen (dynamic molecular diameter: about 0.36 nm) that flows from the side with the separation membrane 30 and inhibits permeation of methane (dynamic molecular diameter: about 0.38 nm). The average pore diameter of the separation membrane 30 is preferably greater than or equal to 0.33 nm and more preferably less than or equal to 0.43 in consideration of achieving both a satisfactory separation performance and a permeation rate.

A narrow pore diameter distribution in the separation membrane 30 is preferred. That is to say, it is preferred that there is a small variation in the pore diameter of the separation membrane 30. In this manner, it is possible to further enhance the nitrogen separation performance of the separation membrane structure 10. More specifically, a variation coefficient obtained by dividing the standard deviation of the pore diameters of the separation membrane 30 by the average pore diameter is preferably less than or equal to 0.4, and more preferably less than or equal to 0.2. The variation coefficient of the pore diameter is a representative value that expresses the degree of variation in the pore diameter distribution. Membrane permeation by methane can be inhibited by reducing the proportion of pores having a large diameter by a configuration in which the variation coefficient is less than or equal to 0.4.

Although there is no particular limitation in relation to the thickness of the separation membrane 30, it may be configured for example as 0.1 micron to 10 microns. When the separation membrane 30 has a thick configuration, there is a tendency for nitrogen separation performance to be enhanced, and when the separation membrane 30 has a thin configuration, there is a tendency for the nitrogen permeation rate to increase.

When the separation membrane 30 is a zeolite membrane, although there is no particular limitation in relation to the framework structure (type) of the zeolite, for example, ABW, ACO, AEI, AEN, AFN, AFT, AFV, AFX, APC, ATN, ATT, ATV, AVL, AWO, AWW, BIK, BRE, CAS, CDO, CGF, CGS, CHA, DAC, DDR, DFT, EAB, EEI, EPI, ERI, ESV, GIS, GOO, HEU, IFY, IHW, IRN, ITE, ITW, JBW, JOZ, JSN, KFI, LEV, LTA, LTJ, MER, MON, MTF, MVY, NSI, OWE, PAU, PHI, RHO, RTE, RTH, RWR, SAS, SAT, SAV, SBN, SFW, SIV, TSC, UEI, UFI, VNI, WEI, WEN, YUG, and ZON, or the like are preferred. In particular, AEI, AFX, CHA, DDR, HEU, LEV, LTA, RHO are preferred due to ease of zeolite crystallization.

When the framework that forms the pores of the zeolite is configured as a ring of less than or equal to an n-membered ring of oxygen, the arithmetic average of the short diameter and the long diameter of the pores of oxygen n-membered rings is taken as the average pore diameter of the zeolite. An oxygen n-membered ring is simply referred to as an n-membered ring in which the number of oxygen atoms that configure the framework that forms the pore is taken to be a number n, in which at least one of a Si atom, Al atom and P atom is included, and which is a moiety that forms a ring structure in which the respective oxygen atoms are bound with a Si atom, an Al atom, a P atom, or the like. For example, when the zeolite has pores formed from an oxygen 8-membered ring, an oxygen 6-membered ring, an oxygen 5-membered ring, and an oxygen 4-membered ring (that is to say, only has pores that are formed by a ring that is less than or equal to an oxygen 8-membered ring), the arithmetic average of the short diameter and the long diameter of the pores of oxygen 8-membered rings is taken to be the average pore diameter.

Furthermore, when the zeolite has plural types of oxygen n-membered ring pores having equal values for n, the arithmetic average of the short diameter and the long diameter of the all of the oxygen n-membered ring pores is taken to be the average pore diameter of the zeolite. For example, when the zeolite only has pores formed from rings that are less than or equal to an oxygen 8-membered ring, and when there is plural types of oxygen 8-membered ring pores, the arithmetic average of the short diameter and the long diameter of the all of the oxygen 8-membered ring pores is taken as the average pore diameter of the zeolite.

The average pore diameter of the zeolite membrane is uniquely defined by the framework structure. The average pore diameter of respective framework structures may be calculated based on the values disclosed in The International Zeolite Association (IZA) "Database of Zeolite Structures" [online], [searched Jan. 22, 2015], Internet <URL: http://www.iza-structure.org/databases/>.

When the framework that forms the pores of the zeolite is formed from rings of less than or equal to an oxygen n-membered ring, the variation coefficient of the pore diameter of the zeolite membrane is calculated using a standard deviation calculated with reference to a population of the short diameters and the long diameters in the oxygen n-membered ring pores. When the zeolite has a plurality of oxygen n-membered rings having equal values for n, the variation coefficient is calculated using a standard deviation calculated with reference to the population of short diameters and long diameters of all the oxygen n-membered ring pores. For example, when the zeolite has pores formed from an oxygen 8-membered ring, an oxygen 6-membered ring, an oxygen 5-membered ring, and an oxygen 4-membered ring (that is to say, only has pores that are formed by rings of less than or equal to an oxygen 8-membered ring), the variation coefficient is calculated using a standard deviation calculated with reference to the population of short diameters and long diameters of all the oxygen 8-membered ring pores.

When the separation membrane 30 is a silica membrane, the average pore diameter and the variation coefficient can be adjusted by controlling the type of membrane starting material, the hydrolysis conditions for the membrane starting materials, the firing temperature, and the firing time, or the like. The average pore diameter of the silica membrane may be calculated based on Formula (1) below. In Formula (1), $d_p$ denotes the average pore diameter of the silica membrane, f denotes the normalized Knudsen permeance, $d_k$, denotes the diameter of the molecule used in Knudsen diffusion testing, and $d_{k,He}$ denotes the diameter of a helium molecule.

$$f=(1-d_k/d_p)^3/(1-d_{k,He}/d_p)^3 \qquad (1)$$

The details of the calculation method for the average pore diameter and in relation to Knudsen diffusion testing are disclosed in Hye Ryeon Lee (four others), "Evaluation and fabrication of pore-size-tuned silica membranes with tetraethoxydimethyl disiloxane for gas separation", AIChE Journal, Volume 57, Issue 10, 2755-2765, October 2011.

The variation coefficient of the silica membrane can be calculated with reference to a pore diameter distribution that is measured using a nano-perm porometer.

When the separation membrane 30 is a carbon membrane, the average pore diameter and the variation coefficient can be adjusted by controlling the type of membrane starting material, the firing temperature, the firing time, and the firing atmosphere, or the like. The average pore diameter of the carbon membrane may be calculated based on Formula (1) above. The variation coefficient of the carbon membrane can be calculated with reference to a pore diameter distribution that is measured using a nano-perm porometer.

Figure 2:
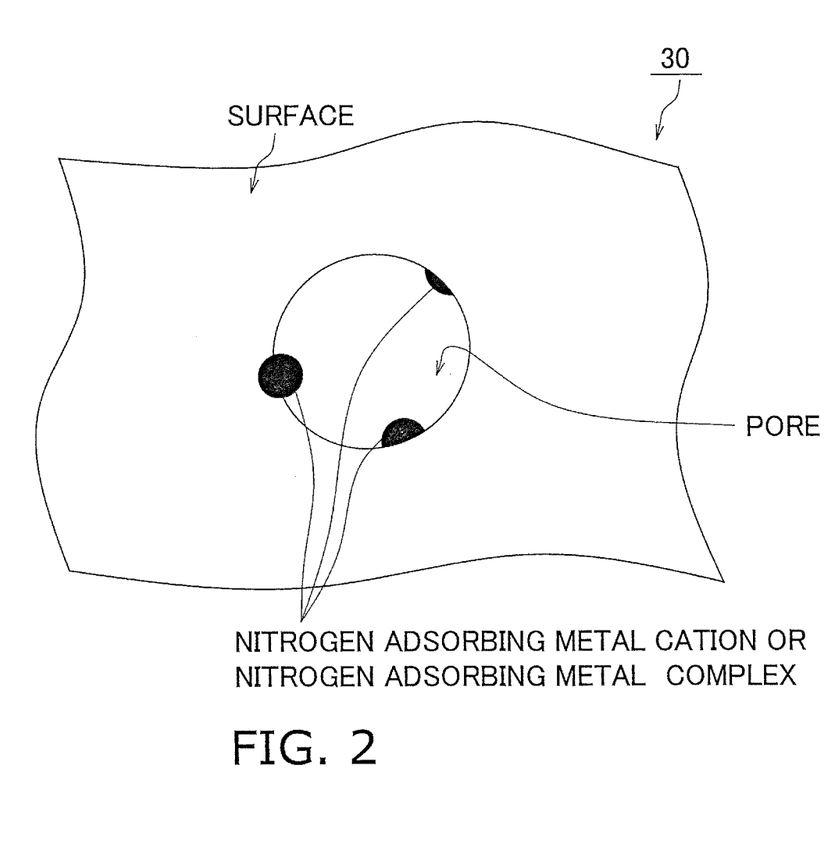
FIG. 2 is an enlarged plan view of a separation membrane.

FIG. 2 is an enlarged plan view of the separation membrane 30. The separation membrane 30 includes addition of at least one of a metal complex that tends to adsorb nitrogen in comparison to methane (referred to below as "nitrogen adsorbing metal complex") and a metal cation that tends to adsorb nitrogen in comparison to methane (referred to below as "nitrogen adsorbing metal cation"). As shown in FIG. 2, the nitrogen adsorbing metal complex or nitrogen adsorbing metal cation is disposed (or exposed) in a pore or on a surface of the separation membrane 30. After nitrogen in a mixed gas containing at least methane and nitrogen is drawn by the nitrogen adsorbing metal complex or the nitrogen adsorbing metal cation and enters into a pore, the nitrogen is adsorbed successively by the nitrogen adsorbing metal complex or the nitrogen adsorbing metal cation and transferred to the porous support 20 as a result of pressure exerted by nitrogen that enters successively into the pore. The nitrogen adsorbing metal cation may be used at least one element selected from Sr, Mg, Li, Ba, Ca, Cu, and Fe. The nitrogen adsorbing metal complex may be used a complex that includes at least one element selected from Ti, Fe, Ru, Mo, Co and Sm. The addition amount (concentration) and type of the nitrogen adsorbing metal complex or the nitrogen adsorbing metal cation in the separation membrane 30 can be measured by EDX (Energy dispersive X-ray spectrometry). Although there is no particular limitation in relation to the total concentration of the nitrogen adsorbing metal complex or the nitrogen adsorbing metal cation, it may be configured as 0.01 to 60%. In consideration of the adsorbent properties of nitrogen, a value of greater than or equal to 0.03% is preferred, and in light of inhibiting pore blockage as a result of an excessive amount of the nitrogen adsorbing metal complex and the nitrogen adsorbing metal cation, a value of less than or equal to 50% is more preferred.

In this context, the term in the present embodiment of "tends to adsorb nitrogen when compared to methane" denotes a configuration in which immediately after exposure to a mixed gas of 1:1 nitrogen and methane, the adsorption amount of nitrogen is greater than the adsorption amount of methane, that is to say, a configuration in which the adsorption ratio of nitrogen is larger. An adsorption ratio can be obtained by measuring the adsorption amount of nitrogen and methane using a powder of the materials that configure the separation membrane 30. Although there is no particular limitation in relation to the method of measuring the adsorption ratio, for example, a mixed gas containing 1:1 nitrogen and methane may be supplied at 10 ml/min to 10 g of a powder of the materials that configure the separation membrane 30, and the molar ratio of nitrogen and methane that is adsorbed by the powder in an initial period (for example, about 10 minutes) may be measured under predetermined conditions (room temperature, 0.1 MPa).

A portion of the nitrogen adsorbing metal complex or the nitrogen adsorbing metal cation contained in the separation membrane 30 may be exposed in a pore or on a surface of the separation membrane 30.

Method of Manufacturing Separation Membrane Structure

A method of manufacturing the separation membrane structure 10 will be described.

(1) Formation of Porous Support 20

Firstly, starting materials for the substrate 21 are molded into a desired shape by use of extrusion molding, a press molding method, a slip cast method, or the like to thereby form a green body for the substrate 21. Next, the green body for the substrate 21 is fired (for example, 900 degrees C. to 1450 degrees C.) to thereby form the substrate 21.

Then, an intermediate layer slurry is prepared by use of a ceramic starting material having a desired particle diameter, and the intermediate layer slurry is formed as a membrane on a surface of the substrate 21 to thereby form a green body for the intermediate layer 22. Next, the green body for the intermediate layer 22 is fired (for example, at 900 degrees C. to 1450 degrees C.) and to thereby form the intermediate layer 22.

Then, a surface layer slurry is prepared by use of a ceramic starting material having a desired particle diameter, and the surface layer slurry is formed as a membrane on a surface of the intermediate layer 22 to thereby form a green body for the surface layer 23. Next, the green body for the surface layer 23 is fired (for example, at 900 degrees C. to 1450 degrees C.) and to thereby form the surface layer 23.

The porous support 20 is formed in the above manner.

(2) Formation of Separation Membrane 30

A separation membrane 30 is formed on a surface of the porous support 20. The separation membrane 30 may be formed using a known and conventional method depending on the type of membrane. Next, the respective methods for forming a zeolite membrane, a silica membrane and a carbon membrane will be described as examples of a method of forming the separation membrane 30.

Zeolite Membrane

Firstly, after pre-coating zeolite as a seed crystal on the surface of the surface layer 23, the porous support 20 is immersed inside a pressure-resistant vessel containing a starting material solution that includes addition of at least one of a nitrogen adsorbing metal cation or a nitrogen adsorbing metal complex to a silica source, an alumina source, an organic template, an alkali source and water. At that time, the addition amount of the nitrogen adsorbing metal cation or the nitrogen adsorbing metal complex may be adjusted to thereby enable control of the nitrogen adsorbing properties of the separation membrane 30.

Next, the pressure-resistant vessel is placed in a drying oven and subjected to thermal processing (hydrothermal synthesis) for about 1 to 240 hours at 100 to 200 degrees C. to thereby form a zeolite membrane. Next, the porous support 20 formed the zeolite membrane is washed and dried at 80 to 100 degrees C.

Then, in a configuration in which an organic template is included in the starting material solution, the porous support 20 is placed in an electric furnace, and heated in an atmosphere of air at 400 to 800 degrees C. for 1 to 200 hours to thereby combust and remove the organic template.

The nitrogen adsorbing metal cation or the nitrogen adsorbing metal complex may be introduced into the zeolite membrane after membrane formation by use of a method such as ion exchange or immersion, or the like rather than by addition in advance into the starting material solution. Furthermore, the nitrogen adsorbing metal cation or the nitrogen adsorbing metal complex may be introduced into the zeolite membrane after membrane formation by use of a method such as ion exchange, immersion, or the like in combination with addition in advance into the starting material solution. In this context, it is possible to control the nitrogen adsorbing properties of the separation membrane 30 by adjusting the introduction amount of the nitrogen adsorbing metal cation or the nitrogen adsorbing metal complex.

The average pore diameter and variation coefficient of a zeolite membrane formed in the above manner is uniquely determined by the framework structure of the zeolite.

Silica Membrane

Firstly, an alkoxysilane such as tetraethoxysilane or the like, an organic alkoxysilane such as methyltrimethoxysilane or the like, or an organic hydroxysilane such as a carboxyethyl silane triol sodium salt or the like is subjected to hydrolysis or condensation in the presence of a catalyst such as hydrochloric acid, nitric acid or the like to thereby form a sol solution, and is diluted with ethanol or water that includes addition of at least one of the nitrogen adsorbing metal cation or the nitrogen adsorbing metal complex to thereby prepare a precursor solution (silica sol solution). In this context, it is possible to control the nitrogen adsorbing properties of the separation membrane 30 by adjusting the addition amount of the nitrogen adsorbing metal cation or the nitrogen adsorbing metal complex.

Then, after the precursor solution is brought into contact with the surface of the surface layer 23, the surface layer 23 is heated to 400 to 700 degrees C. at a rate of 100 degrees C./hr and maintained for one hour. Then the temperature is allowed to fall at a rate of 100 degrees C./hr. A silica membrane is formed by 3 to 5 repetitions of the above steps.

The nitrogen adsorbing metal cation or the nitrogen adsorbing metal complex may be introduced into the zeolite membrane after membrane formation by use of a method such as ion exchange or immersion, or the like rather than by addition in advance into the precursor solution. Furthermore, the nitrogen adsorbing metal cation or the nitrogen adsorbing metal complex may be introduced into the zeolite membrane after membrane formation by use of a method such as ion exchange, immersion, or the like in combination with addition in advance into the precursor solution. In this context, it is possible to control of the nitrogen adsorbing properties of the separation membrane 30 by adjusting the introduction amount of the nitrogen adsorbing metal cation or the nitrogen adsorbing metal complex.

The average pore diameter and variation coefficient of a silica membrane formed in the above manner can be adjusted by controlling the hydrolysis conditions, the firing temperature, the firing time, or the like.

Carbon Membrane

Firstly, a thermo-curing resin such as an epoxy resin, polyimide resin, or the like, a thermoplastic resin such as polyethylene or the like, a cellulose resin, or precursor materials for these materials is dissolved in water or an organic solvent such as methanol, acetone, tetrahydrofuran, NMP, toluene, or the like that includes addition of at least one of the nitrogen adsorbing metal cation or the nitrogen adsorbing metal complex to thereby prepare a precursor solution. In this context, it is possible to control of the nitrogen adsorbing properties of the separation membrane 30 by adjusting the addition amount of the nitrogen adsorbing metal cation or the nitrogen adsorbing metal complex.

Then, after the precursor solution is brought into contact with the surface of the surface layer 23, thermal processing (for example, 500 to 1000 degrees C.) is performed depending on the type of resin contained in the precursor solution to thereby form a carbon membrane.

The nitrogen adsorbing metal cation or the nitrogen adsorbing metal complex may be introduced into the zeolite membrane after membrane formation by use of a method such as ion exchange or immersion, or the like rather than by addition in advance into the precursor solution. Furthermore, the nitrogen adsorbing metal cation or the nitrogen adsorbing metal complex may be introduced into the zeolite membrane after membrane formation by use of a method such as ion exchange, immersion, or the like in combination with addition in advance into the precursor solution. In this context, it is possible to control the nitrogen adsorbing properties of the separation membrane 30 by adjusting the introduction amount of the nitrogen adsorbing metal cation or the nitrogen adsorbing metal complex.

The average pore diameter and variation coefficient of a carbon membrane formed in the above manner can be adjusted by controlling the type of resin, the thermal processing temperature, the thermal processing time, the thermal processing atmosphere, or the like.

Operation and Effect

The separation membrane structure 10 according to the above embodiment includes the porous support 20, and a separation membrane 30 that is formed on the porous support 20. The separation membrane 30 has an average pore diameter of greater than or equal to 0.32 nm and less than or equal to 0.44 nm. The separation membrane 30 contains at least one of a metal cation or metal complex that exhibits a tendency to adsorb nitrogen in comparison to methane.

Therefore, it is possible to draw nitrogen by the adsorption effect of the metal cation or metal complex and to enable selective permeation of nitrogen by a molecular sieve effect in the pores. As a result, it is possible to efficiently separate methane and nitrogen by enabling both satisfactory separation properties and permeation properties of nitrogen.

Other Embodiments

Although an embodiment of the present invention has been described, the present invention is not limited to the above embodiment, and various modifications are possible within a scope that does not depart from the spirit of the invention.

For example, although the porous support 20 includes the substrate 21, the intermediate layer 22 and the surface layer 23, one or both of the intermediate layer 22 and the surface layer 23 may be omitted.

Furthermore, although the separation membrane structure 10 includes the separation membrane 30 stacked onto the porous support 20, a functional layer or protective layer may be further provided in a stacked configuration onto the separation membrane 30. This type of functional layer or protective layer may be an inorganic layer such a zeolite layer, carbon layer, silica layer, or the like, or may be an organic layer such as a polyimide layer, silicone layer or the like. A metal cation or metal complex that exhibits a tendency to adsorb nitrogen in comparison to methane may be added to the functional layer or protective layer stacked onto the separation membrane 30.

EXAMPLES

The examples of the present invention will be described below. However, the present invention is not thereby limited to the following examples.

Preparation of Sample No. 1

A separation membrane structure according to Sample No. 1 is prepared in the following manner.

Firstly, a tube-shaped porous alumina substrate having a diameter of 10 mm and a length of 30 mm is prepared. The pore diameter that opens onto an outer surface of the porous alumina substrate is 0.1 microns.

Next, a low silica DDR-type zeolite membrane having an Si/Al atomic ratio of 40 is formed as a separation membrane an outer surface of a porous alumina substrate. More specifically, firstly, a DDR-type zeolite seed crystal (Si/Al atomic ratio=40) is diluted with ethanol, and the seeding slurry solution prepared to have a concentration of 0.1 mass % is caused to flow into the cell of the porous alumina substrate, and the inner portion of the cell is air-dried under predetermined conditions (room temperature, air velocity 5 m/s, 10 min). Next, after placing 152.4 g of distilled water in a fluororesin wide-mouthed container, 1.32 g of 1-adamantane amine (manufactured by Aldrich), 0.35 g sodium hydroxide (manufactured by Sigma-Aldrich), 52.6 g of 30 wt % silica sol (Trade name Snowtex S, Nissan chemical Industries, Ltd.) and 0.36 g of sodium aluminate acid (manufactured by Wako Pure Chemical Industries, Ltd.) are added. The porous alumina substrate with the DDR-type zeolite seed crystals attached is placed in a fluororesin inner cylinder (internal volume 300 ml) of a stainless steel pressure vessel, the formulated starting material solution is added and thermal processing is performed (hydrothermal synthesis: 160 degrees C., 48 hours) to thereby form a low silica DDR-type zeolite membrane. Then, the porous alumina substrate is washed and dried for greater than or equal to 12 hours at 80 degrees C. Next, the porous alumina substrate is heated to 450 degrees C. in an electric furnace and retained for 50 hours to thereby combust and remove the 1-adamantane amine from the low silica DDR-type zeolite membrane. The average pore diameter of the low silica DDR-type zeolite membrane is 0.40 nm and the variation coefficient is 0.14.

Then, Li introduced as a metal cation into the separation membrane by adding lithium chloride (manufactured by Kanto Kagaku) to water to achieve 0.1 mol/L and maintaining the formulated Li ion exchange solution in contact with the separation membrane for 24 hours. Thereafter the separation membrane is rinsed with water and dried (70 degrees C., 12 hours).

Next, one end of the porous alumina substrate is sealed by adhering a glass plate with an epoxy resin to one end of the porous alumina substrate. Then, a glass tube is connected with an epoxy resin to the other end of the porous alumina substrate.

Preparation of Sample No. 2

Firstly, a porous alumina substrate that is the same as Sample No. 1 is prepared.

Next, a low silica DDR-type zeolite membrane that is the same as Sample No. 1 is formed as a separation membrane on an outer surface of the porous alumina substrate.

Next strontium nitrate (manufactured by Wako Pure Chemical Industries, Ltd.) is added to water to achieve 0.1 mol/L and the formulated Sr ion exchange solution is maintained in contact with the separation membrane for 24 hours to thereby introduce Sr as a metal cation into the separation membrane. Thereafter the separation membrane is rinsed with water and dried (70 degrees C., 12 hours).

Next, one end of the porous alumina substrate is sealed by adhering a glass plate with an epoxy resin to one end of the porous alumina substrate. Then, a glass tube is connected with an epoxy resin to the other end of the porous alumina substrate.

Preparation of Sample No. 3

Firstly, a porous alumina substrate that is the same as Sample No. 1 is prepared.

Next, a low silica DDR-type zeolite membrane that is the same as Sample No. 1 is formed as a separation membrane on an outer surface of the porous alumina substrate.

Next barium chloride dihydrate (manufactured by Wako Pure Chemical Industries, Ltd.) is added to water to achieve 0.1 mol/L and the formulated Ba ion exchange solution is maintained in contact with the separation membrane for 24 hours to thereby introduce Ba as a metal cation into the separation membrane. Thereafter the separation membrane is rinsed with water and dried (70 degrees C., 12 hours).

Next, one end of the porous alumina substrate is sealed by adhering a glass plate with an epoxy resin to one end of the porous alumina substrate. Then, a glass tube is connected with an epoxy resin to the other end of the porous alumina substrate.

Preparation of Sample No. 4

Firstly, a porous alumina substrate that is the same as Sample No. 1 is prepared.

Next, a low silica DDR-type zeolite membrane that is the same as Sample No. 1 is formed as a separation membrane on an outer surface of the porous alumina substrate.

Next copper chloride (manufactured by Wako Pure Chemical Industries, Ltd.) is added to water to achieve 0.1 mol/L and the formulated Cu ion exchange solution is maintained in contact with the separation membrane for 24 hours to thereby introduce Cu as a metal cation into the separation membrane. Thereafter the separation membrane is rinsed with water and dried (70 degrees C., 12 hours), and heating is performed in a vacuum to reduce to the Cu to a monovalent configuration.

Next, one end of the porous alumina substrate is sealed by adhering a glass plate with an epoxy resin to one end of the porous alumina substrate. Then, a glass tube is connected with an epoxy resin to the other end of the porous alumina substrate.

Preparation of Sample No. 5

Firstly, a porous alumina substrate that is the same as Sample No. 1 is prepared.

Next, an organic silica membrane with large pore diameter is formed as a separation membrane on an outer surface of the porous alumina substrate. More specifically, 24.0 g of a 25% aqueous solution of a carboxyethyl silane triol sodium salt, 73.0 g of distilled water, and 3.0 g of 60% nitric acid are added and stirred using a magnetic stirrer (60 degrees C., 6 hours) to thereby form a coating solution. After coating and drying the coating solution on an outer surface of the porous alumina substrate, firing is performed in an air for two hours at 200 degrees C. to form an organic silica membrane. The pore diameter of the separation membrane is determined to be 0.33 nm and the variation coefficient is 0.50.

Next Li is introduced as a metal cation into the separation membrane in the same manner as Sample No. 1.

Next, one end of the porous alumina substrate is sealed by adhering a glass plate with an epoxy resin to one end of the porous alumina substrate. Then, a glass tube is connected with an epoxy resin to the other end of the porous alumina substrate.

Preparation of Sample No. 6

Firstly, a porous alumina substrate that is the same as Sample No. 1 is prepared.

Next, an organic silica membrane that is the same as Sample No. 5 is formed as a separation membrane on an outer surface of the porous alumina substrate.

Next Sr is introduced as a metal cation into the separation membrane in the same manner as Sample No. 2.

Next, one end of the porous alumina substrate is sealed by adhering a glass plate with an epoxy resin to one end of the porous alumina substrate. Then, a glass tube is connected with an epoxy resin to the other end of the porous alumina substrate.

Preparation of Sample No. 7

Firstly, a porous alumina substrate that is the same as Sample No. 1 is prepared.

Next, an organic silica membrane that is the same as Sample No. 5 is formed as a separation membrane on an outer surface of the porous alumina substrate.

Next an Fe complex solution that dissolves [1,2-bis (diphenylphosphino) ethane] iron dichloride as an Fe complex in tetrahydrofuran (THF) is maintained in contact with the separation membrane for 24 hours to thereby introduce an Fe complex into the separation membrane. Thereafter the separation membrane is rinsed with water and dried (70 degrees C., 12 hours).

Next, one end of the porous alumina substrate is sealed by adhering a glass plate with an epoxy resin to one end of the porous alumina substrate. Then, a glass tube is connected with an epoxy resin to the other end of the porous alumina substrate.

Preparation of Sample No. 8

Firstly, a porous alumina substrate that is the same as Sample No. 1 is prepared.

Next, an organic silica membrane that is the same as Sample No. 5 is formed as a separation membrane on an outer surface of the porous alumina substrate.

Next a Mn complex solution that dissolves (cyclopentadienyl) manganese tricarbonyl as a Mn complex in benzene is maintained in contact with the separation membrane for 24 hours to thereby introduce an Mn complex into the separation membrane. Thereafter the separation membrane is rinsed with water and dried (70 degrees C., 12 hours), and ultraviolet irradiation is performed to form a dicarbonyl configuration of the Mn complex.

Next, one end of the porous alumina substrate is sealed by adhering a glass plate with an epoxy resin to one end of the porous alumina substrate. Then, a glass tube is connected with an epoxy resin to the other end of the porous alumina substrate.

Preparation of Sample No. 9

Firstly, a porous alumina substrate that is the same as Sample No. 1 is prepared.

Next, a low silica CHA-type zeolite membrane having an Si/Al atomic ratio of 5.2 is formed making reference to Japanese Patent Application Laid-Open No. 2013-126649 as a separation membrane on an outer surface of the porous alumina substrate. The average pore diameter of the low silica CHA-type zeolite membrane is 0.38 nm and the variation coefficient is 0.00.

Next, Li is introduced as a metal cation into the separation membrane in the same manner as Sample No. 1.

Next, one end of the porous alumina substrate is sealed by adhering a glass plate with an epoxy resin to one end of the porous alumina substrate. Then, a glass tube is connected with an epoxy resin to the other end of the porous alumina substrate.

Preparation of Sample No. 10

Firstly, a porous alumina substrate that is the same as Sample No. 1 is prepared.

Next, an AFX-type zeolite membrane is formed as a separation membrane on an outer surface of the porous alumina substrate. More specifically, making reference to Chemistry of Materials, 8(10), 2409-2411 (1996), an AFX-type zeolite powder is synthesized and coated onto an outer surface of the porous alumina substrate. Then, the porous alumina substrate is immersed in a synthesis sol that is the same as the configuration used in relation to the synthesis of the zeolite powder to thereby perform membrane formation of an AFX-type zeolite membrane by hydrothermal synthesis. The average pore diameter of the AFX-type zeolite membrane is 0.35 nm and the variation coefficient is 0.04.

Next, Li is introduced as a metal cation into the separation membrane in the same manner as Sample No. 1.

Next, one end of the porous alumina substrate is sealed by adhering a glass plate with an epoxy resin to one end of the porous alumina substrate. Then, a glass tube is connected with an epoxy resin to the other end of the porous alumina substrate.

Preparation of Sample No. 11

Firstly, a porous alumina substrate that is the same as Sample No. 1 is prepared.

Next, an HEU-type zeolite membrane is formed as a separation membrane on an outer surface of the porous alumina substrate. More specifically, making reference to Japanese Patent Application Laid-Open No. 2000-237584, an HEU-type zeolite powder is synthesized and coated onto an outer surface of the porous alumina substrate. Then, the porous alumina substrate is immersed in a synthesis sol that is the same as the configuration used in relation to the synthesis of the zeolite powder to thereby perform membrane formation of an HEU-type zeolite membrane by hydrothermal synthesis. The average pore diameter of the HEU-type zeolite membrane is 0.43 nm and the variation coefficient is 0.39.

Next, Li is introduced as a metal cation into the separation membrane in the same manner as Sample No. 1.

Next, one end of the porous alumina substrate is sealed by adhering a glass plate with an epoxy resin to one end of the porous alumina substrate. Then, a glass tube is connected with an epoxy resin to the other end of the porous alumina substrate.

Preparation of Sample No. 12

Firstly, a porous alumina substrate that is the same as Sample No. 1 is prepared.

Next, an ANA-type zeolite membrane is formed as a separation membrane on an outer surface of the porous alumina substrate. More specifically, making reference to Japanese Patent Application Laid-Open No. 54-146300, an ANA-type zeolite powder is synthesized and coated onto an outer surface of the porous alumina substrate. Then, the porous alumina substrate is immersed in a synthesis sol that is the same as the configuration used in relation to the synthesis of the zeolite powder to thereby perform membrane formation of an ANA-type zeolite membrane by hydrothermal synthesis. The average pore diameter of the ANA-type zeolite membrane is 0.29 nm and the variation coefficient is 0.63.

Next, Li is introduced as a metal cation into the separation membrane in the same manner as Sample No. 1.

Next, one end of the porous alumina substrate is sealed by adhering a glass plate with an epoxy resin to one end of the porous alumina substrate. Then, a glass tube is connected with an epoxy resin to the other end of the porous alumina substrate.

Preparation of Sample No. 13

Firstly a porous alumina substrate that is the same as Sample No. 1 is prepared.

Next, a low silica MFI-type zeolite membrane having an Si/Al atomic ratio of greater than or equal to 20 is formed as a separation membrane on an outer surface of the porous alumina substrate. More specifically, firstly, after diluting the low silica MFI-type zeolite seed crystal (Si/Al atomic ratio=20) with ethanol, the seeding slurry solution prepared to have a concentration of 0.1 mass % is caused to flow into the cell of the porous alumina substrate, and the inner portion of the cell is air-dried under predetermined conditions (room temperature, air velocity 5 m/s, 10 min). Next, after mixing 6.28 g of 40 mass % tetrapropylammonium hydroxide solution (manufactured by SACHEM, Inc.), 4.97 g of tetrapropylammonium bromide (manufactured by Wako Pure Chemical Industries), 26.3 g of sodium hydroxide (manufactured by Sigma-Aldrich), and 0.54 g of aluminum sulfate (manufactured by Wako Pure Chemical Industries), 147.1 g of distilled water and 14.8 g of about 30 mass % silica sol (trade name: Snowtex S, manufactured by Nissan chemical Industries, Ltd.) are added and stirred with a magnetic stirrer (room temperature, 30 minutes) to thereby prepare a sol for membrane formation. After the resulting membrane formation sol is placed in a fluororesin inner cylinder (internal volume 300 ml) of a stainless steel pressure vessel, and the porous alumina substrate with the zeolite seed crystals attached is immersed and reacted for 32 hours in a hot air drying oven at a temperature of 160 degrees C. to thereby form a low silica MFI-type zeolite membrane. Then, the porous alumina substrate is washed and dried for greater than or equal to 12 hours at 80 degrees C. Next, the porous alumina substrate is heated to 500 degrees C. in an electric furnace and retained for 4 hours to remove the tetrapropylammonium from the low silica MFI-type zeolite membrane. The average pore diameter of the low silica MFI-type zeolite membrane is 0.54 nm and the variation coefficient is 0.04.

Next, Li is introduced as a metal cation into the separation membrane in the same manner as Sample No. 1.

Next, one end of the porous alumina substrate is sealed by adhering a glass plate with an epoxy resin to one end of the porous alumina substrate. Then, a glass tube is connected with an epoxy resin to the other end of the porous alumina substrate.

Gas Separation Testing

Gas separation testing is performed by use of the separation membrane structure in Sample Nos. 1 to 13.

Firstly after sufficiently drying the separation membrane structure, a mixed gas of nitrogen and methane (molar ratio 1:1) is supplied to an outer side of the separation membrane structure at a temperature of 23 degrees C. and a pressure of 0.3 MPa.

Next the composition and flow amount of a permeating gas that permeates the separation membrane and flows out of the glass tube is analyzed. The flow amount of the permeating gas is measured using a mass flow meter. The composition of the permeating gas is measured using gas chromatography. The composition and flow amount of the permeating gas are used to calculate a permeation rate of methane and nitrogen per unit membrane surface area·unit pressure difference·unit membrane thickness, and (nitrogen permeation rate)/(methane permeation rate) is taken to be the nitrogen separation performance. Table 1 shows an evaluation of the nitrogen separation performance into A, B, C from highest to lowest, and evaluates the high nitrogen permeation rate into A, B, C from highest to lowest.

TABLE 1

| Sample No. | Separation Membrane Material | Average Pore Diameter (nm) | Metal Cation or Metal Complex | Variation Coefficient | Nitrogen Separation Performance | Nitrogen Permeation Rate |
|---|---|---|---|---|---|---|
| 1 | Low Silica DDR | 0.40 | Li | 0.14 | A | B |
| 2 | Low Silica DDR | 0.40 | Sr | 0.14 | A | B |
| 3 | Low Silica DDR | 0.40 | Ba | 0.14 | A | B |
| 4 | Low Silica DDR | 0.40 | Cu | 0.14 | A | B |
| 5 | Organic Silica | 0.33 | Li | 0.50 | B | A |
| 6 | Organic Silica | 0.33 | Sr | 0.50 | B | A |
| 7 | Organic Silica | 0.33 | Fe Complex | 0.50 | B | A |
| 8 | Organic Silica | 0.33 | Mn Complex | 0.50 | B | A |
| 9 | Low Silica CHA | 0.38 | Li | 0.00 | A | B |
| 10 | AFX | 0.35 | Li | 0.04 | A | B |
| 11 | HEU | 0.43 | Li | 0.39 | A | B |

TABLE 1-continued

| Sample No. | Separation Membrane Material | Average Pore Diameter (nm) | Metal Cation or Metal Complex | Variation Coefficient | Nitrogen Separation Performance | Nitrogen Permeation Rate |
|---|---|---|---|---|---|---|
| 12 | ANA | 0.29 | Li | 0.63 | C | C |
| 13 | Low Silica MFI | 0.54 | Li | 0.04 | C | A |

As shown in Table 1, the nitrogen separation performance is enhanced in Sample Nos. 1 to 11 in which the average pore diameter of the separation membrane is greater than or equal to 0.32 nm and less than or equal to 0.44 nm, and which are provided with a separation membrane that includes addition of at least one of a metal cation and metal complex that exhibit a tendency to adsorb nitrogen in comparison to methane.

Furthermore, with reference to Sample Nos. 1 to 11 in which the average pore diameter of the separation membrane is greater than or equal to 0.32 nm and less than or equal to 0.44 nm, Sample Nos. 1 to 4, and 9 to 11 in which the variation coefficient is less than or equal to 0.4 enable a further enhancement to the nitrogen separation performance.

The invention claimed is:

1. A separation membrane structure configured for selective permeation of nitrogen from a mixed gas that contains at least methane and nitrogen, the separation membrane structure comprising:
   a porous support,
   a separation membrane formed on the porous support, and having an average pore diameter of greater than or equal to 0.32 nm and less than or equal to 0.44 nm,
   wherein the separation membrane includes a first material and a second material selected from at least one of (i) a metal cation or (ii) a metal complex, both of which adsorb a greater amount of nitrogen as compared to an amount of methane, the second material being disposed or exposed in a pore or on a surface of the first material, and
   wherein the metal cation added to the separation membrane is at least one element selected from Sr, Mg, Li, Ba, Ca, Cu, and Fe.

2. The separation membrane structure according to claim 1, wherein
   the metal complex added to the separation membrane is a complex that includes at least one element selected from Ti, Fe, Ru, Mo, Co and Sm.

3. The separation membrane structure according to claim 1, wherein
   a variation coefficient obtained by dividing a standard deviation of pore diameters of the separation membrane by the average pore diameter is less than or equal to 0.4.

4. The separation membrane structure according to claim 1, wherein the first material is selected from the group consisting of zeolite, silica and carbon.

* * * * *